United States Patent
Hsu et al.

(10) Patent No.: US 7,999,890 B2
(45) Date of Patent: Aug. 16, 2011

(54) LIQUID CRYSTAL DRIVING ELECTRODE AND A LIQUID CRYSTAL DISPLAY USING THE SAME

(75) Inventors: Yen-Hua Hsu, Hsinchu (TW); Hsin-yi Lai, Taipei (TW); Chung-Hung Chen, Hsinchu (TW)

(73) Assignee: AU Optronics Corporation, Hsin-Chu (TW)

( * ) Notice: Subject to any disclaimer, the term of this patent is extended or adjusted under 35 U.S.C. 154(b) by 916 days.

(21) Appl. No.: 11/539,314

(22) Filed: Oct. 6, 2006

(65) Prior Publication Data

US 2007/0216834 A1    Sep. 20, 2007

(30) Foreign Application Priority Data

Mar. 16, 2006  (TW) ................. 95108941 A

(51) Int. Cl.
 *G02F 1/1335*    (2006.01)
(52) U.S. Cl. ....................................... 349/114
(58) Field of Classification Search ........ 349/114
 See application file for complete search history.

(56) References Cited

U.S. PATENT DOCUMENTS

| | | | |
|---|---|---|---|
| 6,452,654 B2* | 9/2002 | Kubo et al. | 349/114 |
| 6,757,038 B2* | 6/2004 | Itoh et al. | 349/113 |
| 6,853,421 B2 | 2/2005 | Sakamoto et al. | |
| 7,212,265 B2* | 5/2007 | Eguchi et | 349/113 |
| 7,528,910 B2* | 5/2009 | Tsuchiya | 349/114 |
| 7,826,014 B2* | 11/2010 | Yamashita et al. | 349/114 |

FOREIGN PATENT DOCUMENTS

| | | |
|---|---|---|
| JP | 2003172923 | 6/2003 |
| JP | 2004279565 A | 10/2004 |
| TW | 200301394 | 7/2003 |

OTHER PUBLICATIONS

Taiwan Office Action dated May 27, 2010.
English translation of abstract of JP2004279565.

* cited by examiner

*Primary Examiner* — Mark Robinson
*Assistant Examiner* — Charles Chang
(74) *Attorney, Agent, or Firm* — Thomas, Kayden, Horstemeyer & Risley, LLP

(57) ABSTRACT

A liquid crystal driving electrode and a liquid crystal display using the same are provided. The liquid crystal driving electrode includes a substrate, a reflecting electrode layer, and a light-transmissible electrode. The substrate includes a plurality of pixels; each pixel has a reflection area and a transmission area adjacent to the reflection area. The reflecting electrode overlaps the reflecting area while the light-transmissible electrode overlaps the transmission area. The reflecting electrode has an effective margin. The light-transmissible electrode electrically connects to the reflecting electrode and extends to overlap the effective margin.

25 Claims, 11 Drawing Sheets

LIQUID CRYSTAL DRIVING ELECTRODE AND A LIQUID CRYSTAL DISPLAY USING THE SAME

This application claims priority based on a Taiwanese patent application No. 095108941 filed on Mar. 16, 2006

BACKGROUND OF THE INVENTION

1. Field of the Invention

The present invention relates generally to a liquid crystal driving electrode and a liquid crystal display using the same.

2. Description of the Prior Art

In recent years, liquid crystal display (hereinafter referred to as LCD) devices have been widely adopted as the display device for all kinds of products, such as LCD TV, LCD monitor for PC and laptop, mobile phone and digital camera. Divided by different approaches of light source, the following three types of LCD are the commonest products in this field: transmissive type LCD, reflective type LCD, and transflective LCD. Among which, transflective LCD is the main-stream product in small size panel market because it takes advantages of both transmissive type LCD and reflective type LCD, such as power saving and better display effect indoors and outdoors.

FIG. 1 shows a prior art liquid crystal driving electrode of the transflective LCD device. As shown in FIG. 1, each pixel 11 on the substrate 10 has a reflecting electrode 30 and an adjacent light-transmissible electrode 50. The reflecting electrode 30 generates the light by reflecting an exterior light source or an ambient light while the light-transmissible electrode 50 generates the light by using backlight. Since the material properties of the reflecting electrode 30 and the light-transmissible electrode 50 are different, it requires different manufacturing process to form both electrodes on the substrate 10. In addition, the reflecting electrode 30 and the light-transmissible electrode 50 are produced by different manufacturing process in sequence. No matter which process is precedent, the latter electrode manufacturing process would inevitably damage and harm the electrode produced earlier.

In the example of forming the reflecting electrode 30 on the substrate 10 first, deposition and developing approach will be employed to form the light-transmissible electrode 50 afterwards. The former produced reflecting electrode 30 will be inevitably soaked in the developing agent and stripper many times to produce the light-transmissible electrode 50 in the latter manufacturing process under such condition. If the latter cleaning and surfacing steps are taken into consideration additionally, it would undoubtedly damage the structure of reflecting electrode 30. The similar damages would also occur even if the manufacturing process were reversely employed.

As a result of damage, the adhesive between different layers is harmed, and the tilts often occur on the edge or in the corner area of the electrodes with damaged structure, where cracks sometimes accordingly occur. Therefore, there tends to be the problem of lower yield rate and less endurance for those electrodes with damaged structure.

SUMMARY OF THE INVENTION

It is an object of the present invention to provide a liquid crystal driving electrode to decrease the tilt and crack condition of reflecting electrode layer. It is another object of the present invention to provide a liquid crystal driving electrode having better endurance and product yield rate. It is a further object of the present invention to provide a liquid crystal driving electrode having a better reflecting rate. It is yet another object of the invention to provide a liquid crystal display device, from which the liquid crystal driving electrode has better yield rate.

The present invention of the liquid crystal display includes a liquid crystal driving electrode, a biased electrode and a liquid crystal layer. The liquid crystal driving electrode is disposed opposite to and parallels to the biased electrode. The liquid crystal layer is composed of the liquid crystal molecule contained and sealed between the liquid crystal driving electrode and the biased electrode. Alignment behavior of the liquid crystal molecule may be controlled by changing the field between the liquid crystal driving electrode and the biased electrode.

The liquid crystal driving electrode comprises a substrate, a reflecting electrode layer and a light-transmissible electrode. The substrate includes a plurality of pixels; each pixel has a reflection area and an adjacent transmission area. The reflecting electrode layer overlaps the reflection area while the light-transmissible electrode overlaps the transmission area. In the preferred embodiment, the reflection area includes an active switch component being disposed in said reflection area and at least partially overlapped by said reflecting electrode layer. In addition, the reflecting electrode layer includes an optical reflecting pattern to provide better reflecting effect.

The reflecting electrode layer has an outside boundary, a transmission area boundary and an effective margin. The transmission area boundary is the boundary where the reflecting electrode layer adjacent to the transmission area. The outside boundary is the boundary other than the transmission area boundary. The outside boundary and the transmission area boundary jointly form a closed boundary of the reflecting electrode layer. The effective margin is on the surface of the reflecting electrode and adjacent to the outside boundary. The effective margin mentioned here means that while the displacement of full or the part of the reflecting electrode layer within the effective margin is restricted in the direction vertical to the substrate, the displacement of the outside boundary is simultaneously limited in the direction vertical to the substrate due to its mechanical structure.

The light-transmissible electrode electrically connects to the transmission area boundary of the reflecting electrode layer and extends fully or partially to overlap the effective margin. Since the reflecting electrode layer partially overlapped by the light-transmissible electrode may avoid being exposed in the latter manufacturing process and further decreasing the opportunity of damage, the structure of that part of the reflecting electrode layer and its adhesive with the substrate are both better. In other words, the displacement of the part of the reflecting electrode layer may encounter stronger restriction in the direction vertical to the substrate, further limit the displacement of the outside boundary in the direction vertical to the substrate simultaneously due to the mechanical structure. In addition, the light-transmissible electrode has the function of directly restricting the displacement of the reflecting electrode layer in the direction vertical to the substrate around the effective margin. Therefore, the tilts and cracks may not occur in the outside boundary of the reflecting electrode layer during the complicated manufacturing process because of the light-transmissible electrode covering on it.

BRIEF DESCRIPTION OF THE DRAWINGS

FIG. 8b is a sectional view of the preferred embodiment shown in FIG. 8a;

FIG. 9b is a sectional view of the preferred embodiment shown in FIG. 9a;

FIG. 10b is a sectional view of the preferred embodiment shown in FIG. 10a;

FIG. 11b is a sectional view of the preferred embodiment shown in FIG. 11a.

DETAILED DESCRIPTION OF THE PREFERRED EMBODIMENT

The present invention provides a liquid crystal driving electrode and a liquid crystal display using the same. In a preferred embodiment, the liquid crystal driving electrode mentioned here refers to a thin film substrate electrode, in which a transflective type of thin film substrate electrode is more preferred. In another embodiment, however, the other type of substrate electrode may be included in the liquid crystal driving electrode hereinto as well. The liquid crystal display of the invention includes any color or mono liquid crystal display device applied in all kinds of electronic products. The electronic products device here includes home LCD TV, LCD monitor for PC and laptop, mobile phone and digital camera.

Figure 1:
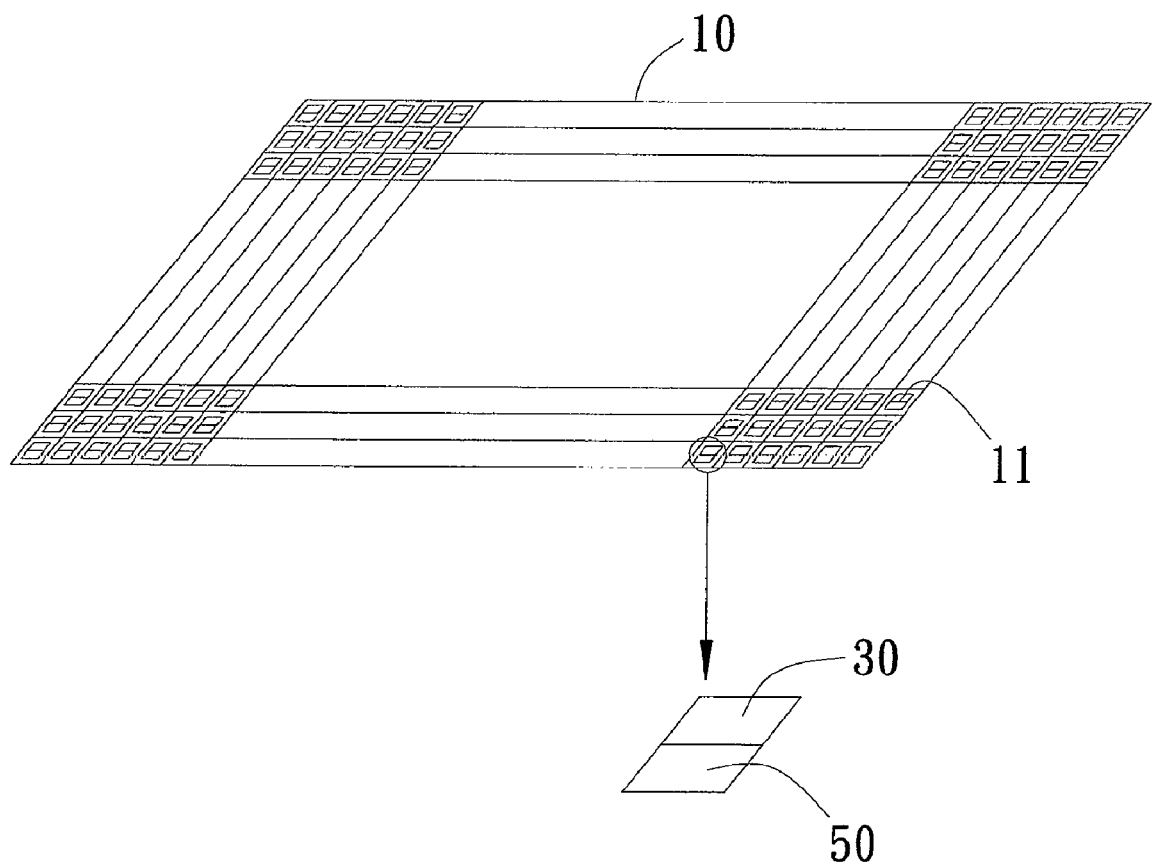
FIG. 1 shows a prior art of transflective liquid crystal driving electrode.
Figure 2:
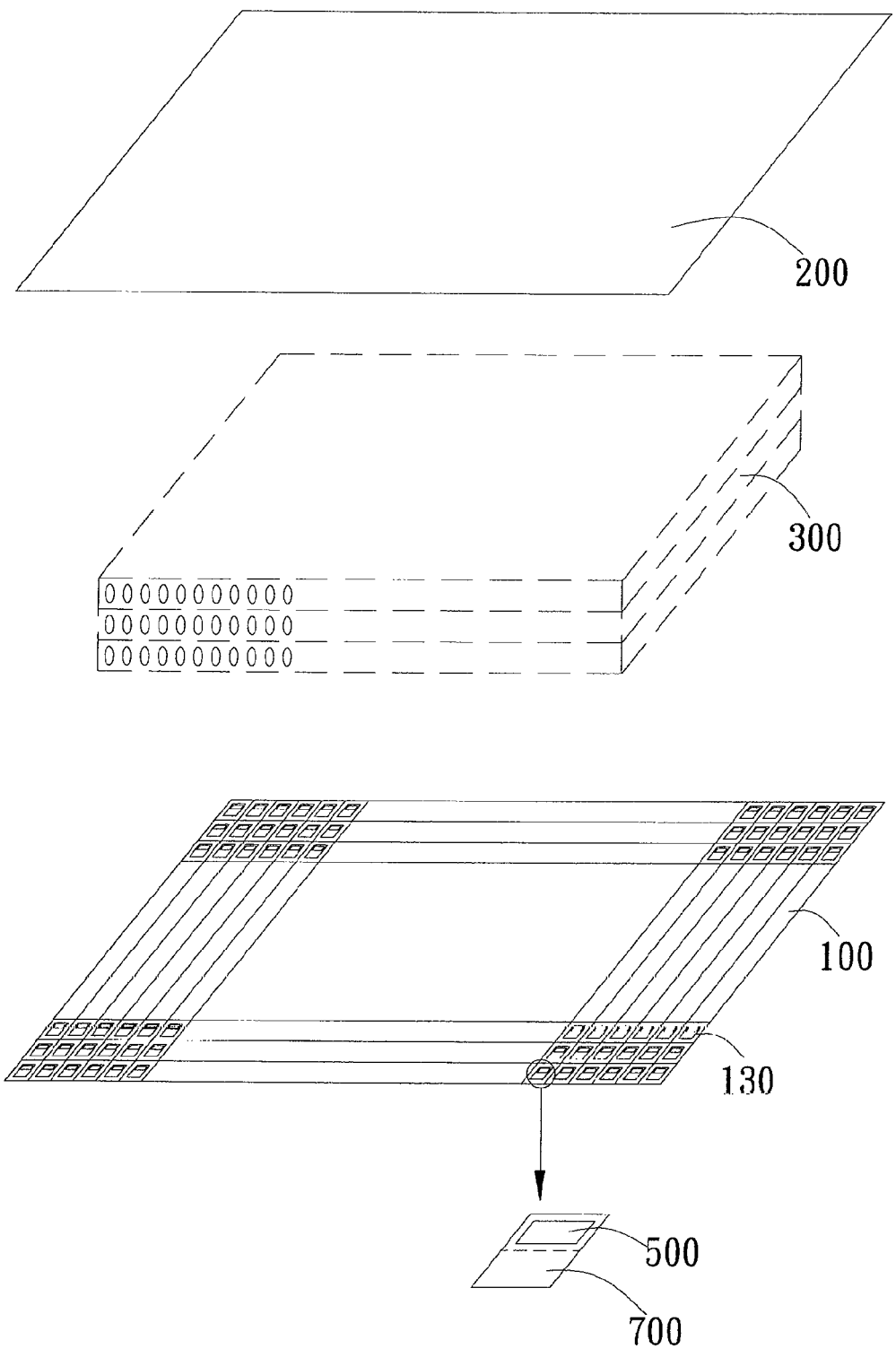
FIG. 2 is an explosive view of the liquid crystal display device of the preferred embodiment of the present invention.

FIG. 2 is a preferred embodiment of the liquid crystal display device of the invention. The liquid crystal display device includes a liquid crystal driving electrode 100, a biased electrode 200, and a liquid crystal layer 300. As FIG. 2 shows, the liquid crystal driving electrode 100 is disposed opposite to and parallels to the biased electrode 200. The liquid crystal layer 300 is disposed between the liquid crystal driving electrode 100 and the biased electrode 200. In the preferred embodiment, the biased electrode 200 includes a transparent electrode and provides a stable bias. The preferred embodiment of the biased electrode 200 is made of indium tin oxide (ITO). However, in another embodiment, the biased electrode 200 may be made of indium zinc oxide (IZO) or other transparent material conduct electricity. The liquid crystal layer 300 is composed of the liquid crystal molecule contained and sealed between the liquid crystal driving electrode 100 and the biased electrode 200. Alignment behavior of the liquid crystal molecule may be controlled by changing the field between the liquid crystal driving electrode 100 and the biased electrode 200.

Figure 3:
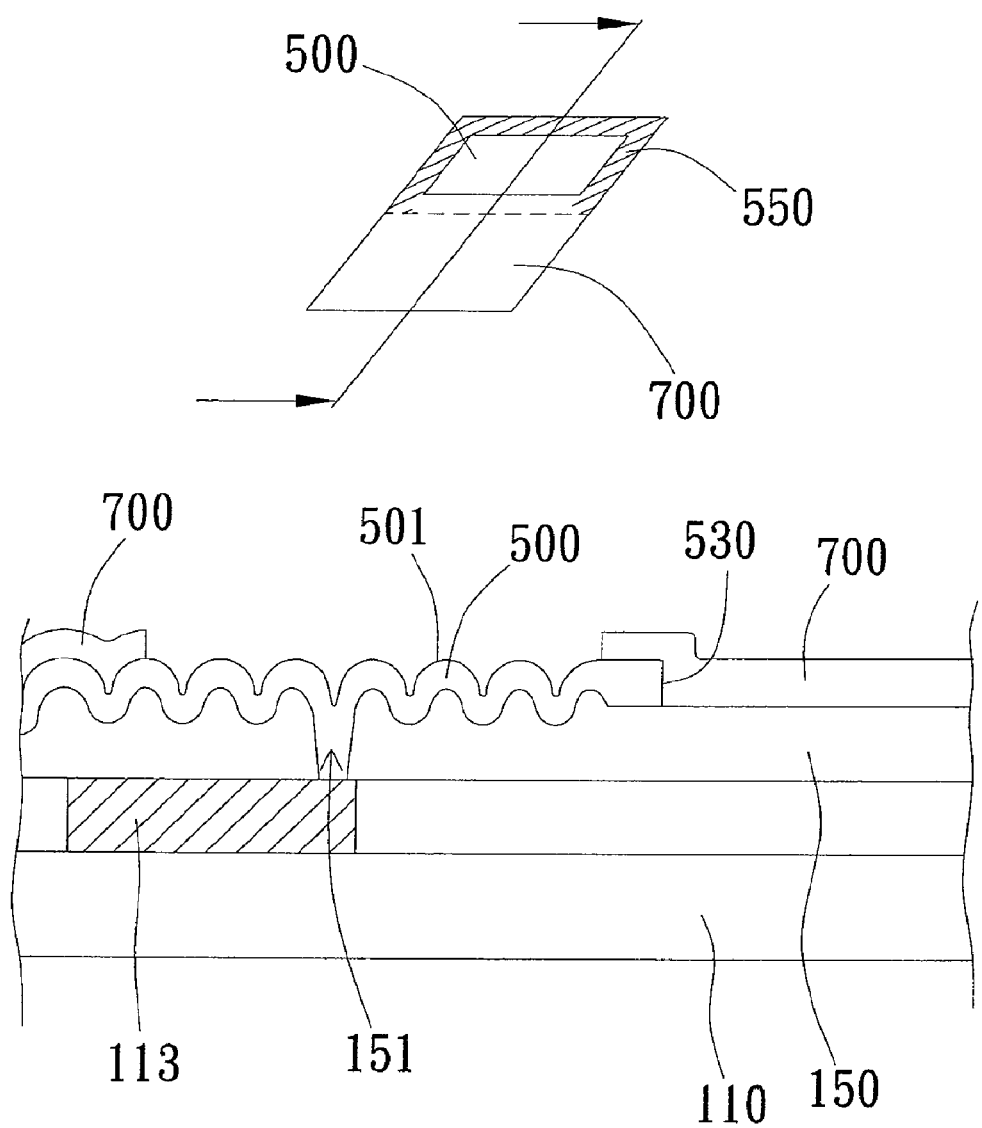
FIG. 3 is a sectional view of the preferred embodiment of the liquid crystal driving electrode of the present invention.

As FIG. 3 shows, the liquid crystal driving electrode 100 includes a substrate 110, a reflecting electrode layer 500 and a light-transmissible electrode 700. Preferably, the substrate 110 includes a glass substrate, however, it may include a transparent thin-film or other light-transmissible material in another embodiment. In this embodiment, an active switch component 113 is formed on the substrate 10. The preferred embodiment of the active switch component 113 includes a thin film transistor (hereinafter referring as "TFT") component. The TFT mentioned here includes a LTPS TFT, a-Si TFT or other type of TFT.

Figure 4:
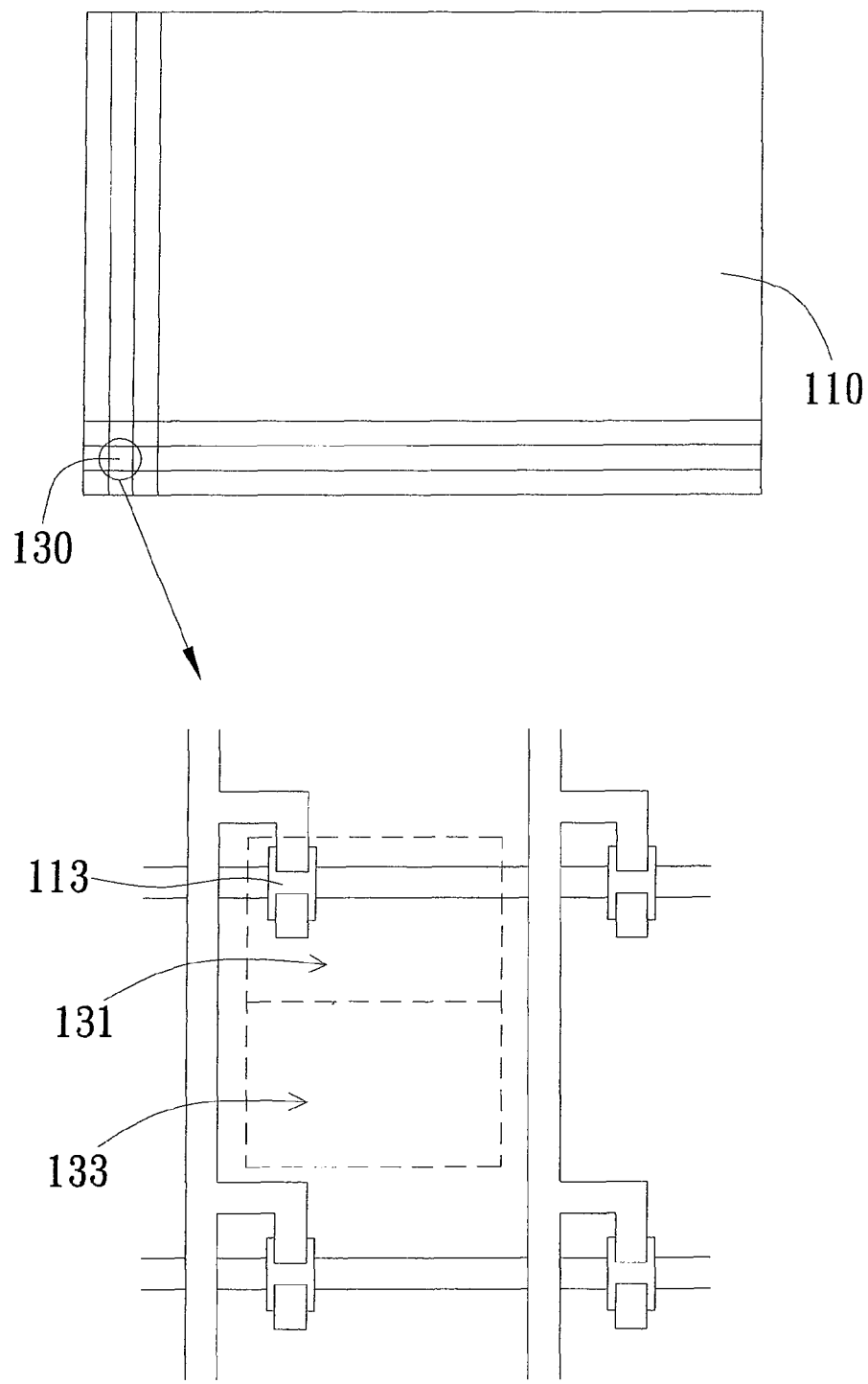
FIG. 4 is a top view of the preferred embodiment of the substrate.

In the embodiment shown in FIG. 4, the substrate 110 includes a plurality of pixels 130. Each pixel has a reflection area 131 and an adjacent transmission area 133. In the preferred embodiment, the active switch component 113 is formed within the reflection area 131. However, in another embodiment, the active switch component may also be formed outside the reflection area 131 and the transmission area 133. In addition, in another embodiment, the pixels on the substrate 110 may be driven by passive signal.

As FIG. 3 shows, the preferred embodiment of the substrate 110 includes an insulation layer 150. The insulation layer 150 preferably overlaps the surface of the substrate 110, includes the reflection area 131 and the transmission area 133. However, in the embodiment, the insulation layer 150 includes an electrical connecting hole/via 151 above the active switch component 113. The preferred embodiment of the insulation layer 150 is made of propylene resin or other organic material.

Figure 5:
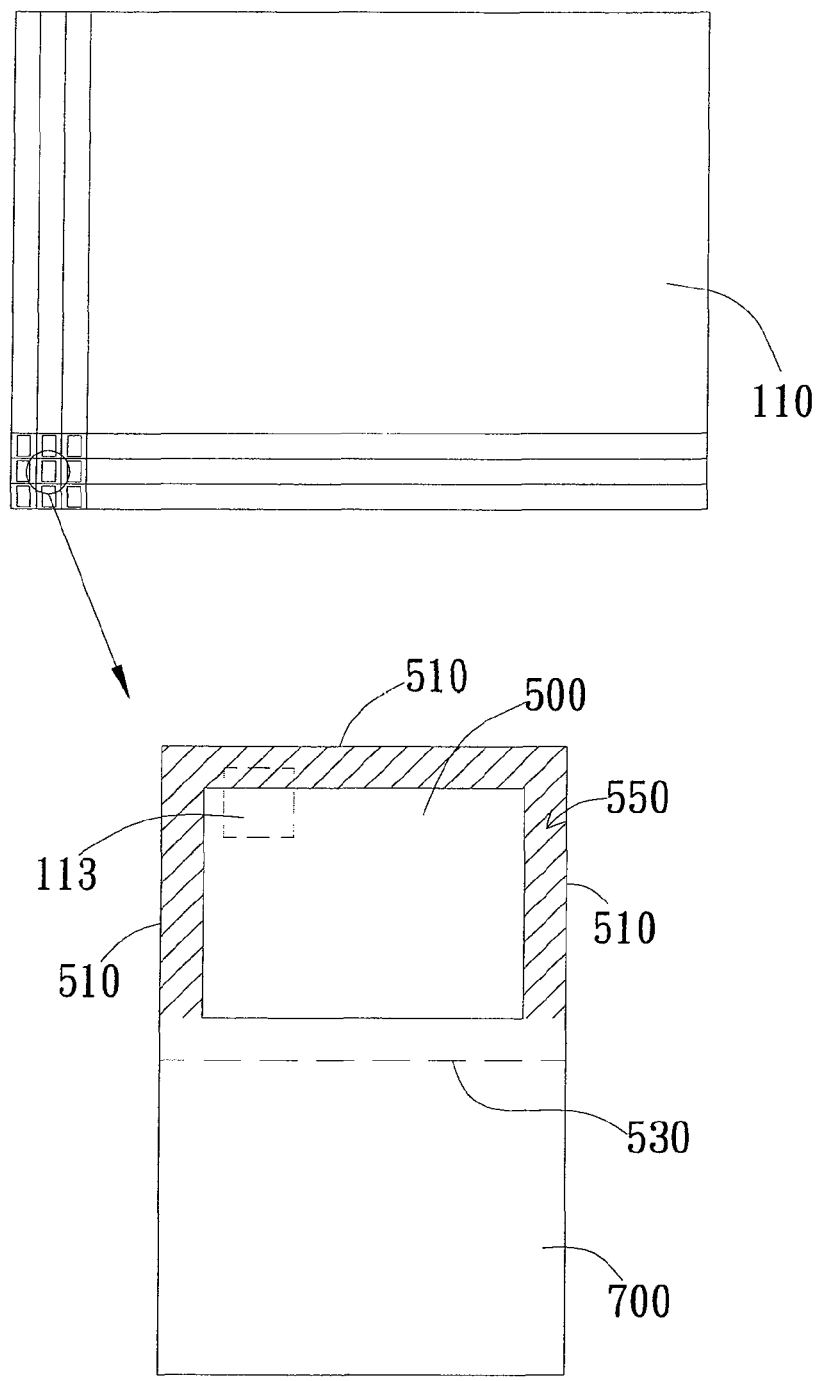
FIG. 5 is a top view of the preferred embodiment of the liquid crystal driving electrode of the present invention.

As FIG. 3 and FIG. 5 show, the reflecting electrode layer 500 overlaps the reflection area 131 on the substrate 110. In the preferred embodiment, the reflecting electrode layer 500 passes through the electrical connecting hole 151 and electrically connects to the active switch component 113. However, in another embodiment, an electrically connecting component may be formed within the electrically connecting hole 151 to electrically connect the reflecting electrode layer 500 and the active switch component 113. It is also possible to employ other method to electrically connect the reflecting electrode layer 500 and the active switch component 113. Besides, in the preferred embodiment, the reflecting electrode layer 500 substantially overlaps the whole active switch component 113. However, in another embodiment, the reflecting electrode layer 500 may overlap a part of the active switch component 113 or may not overlap it.

As the embodiment shown in FIG. 3, the surface of the reflecting electrode layer 500 includes an optical reflecting pattern 501 to provide better reflecting effect. In the preferred embodiment, the optical reflecting pattern 501 is composed of geometry elements having wave-shaped cross-section. However, in another embodiment, the optical reflecting pattern 501 may be composed of geometry elements having saw-tooth-shaped cross-section. In addition, the optical reflecting pattern 501 may be formed on the reflecting electrode layer 500 by way of deposition, etching or other methods.

As shown in FIG. 5, the reflecting electrode layer 500 has an outside boundary 510, a transmission area boundary 530 and an effective margin 550. The transmission area boundary 530 is the boundary where the reflecting electrode layer 500 adjacent to the light-transmission area 133. The outside boundary 510 is the boundary where the reflecting electrode layer 550 adjacent to the Black Matrix Area (not shown) in addition to the transmission area boundary 530. In other words, the outside boundary 510 and the transmission area boundary 530 jointly form a closed boundary of the reflecting electrode layer 500.

The effective margin 550 is located on the surface of the reflecting electrode layer 500 and adjacent to the outside boundary; that is, located inside the outside boundary 510 and extending along with the outside boundary 510. As the embodiment shown in FIG. 5, the effective margin 550 extends to form a ⌐or U shaped girdle area along with the outside boundary 510. However, in another embodiment, the shape of the effective margin 550 may be changed upon different material and structure. The effective margin 550 mentioned here means that while the displacement of full or the part of the reflecting electrode layer 500 within the effective margin 550 is restricted in the direction vertical to the substrate 110, the displacement of the outside boundary 510 is simultaneously limited in the direction vertical to the substrate 110 due to its mechanical structure. In the preferred embodiment, the width of the effective margin 550 is between 1 micrometers and 10 micrometers.

Figure 6:
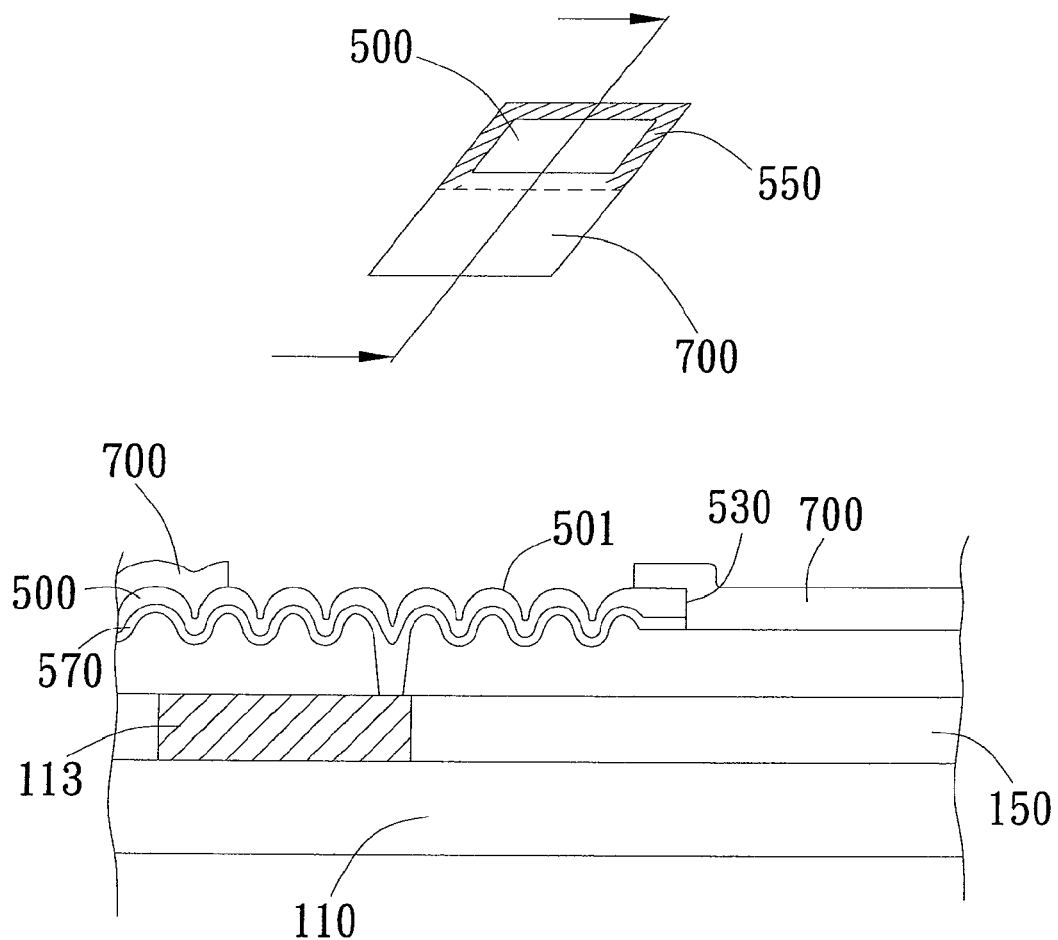
FIG. 6 is a sectional view of another preferred embodiment of the liquid crystal driving electrode of the present invention.

In the preferred embodiment, the thickness of the reflecting electrode layer 500 is equal to or more than 200 Å. The reflecting electrode layer 500 preferably includes Al electrode layer. However, in another embodiment, the reflecting electrode layer 500 may include Al—Nd alloy, Ag or other material being able to conduct electricity and reflect the light at the same time. As the embodiment shown in FIG. 6, the reflecting electrode layer 500 may also be overlaid by several metallic layers, for example, connecting the insulation layer 150 with Mo electrode layer to form the lower layer 570, then forming Al or other metallic electrode layer on the Mo electrode layer. However under the condition, the thickness of the Mo electrode layer is equal to or more than 50 Å. In addition, the reflecting electrode layer 500 may be formed on the substrate 110 by way of deposition, evaporation, sputtering deposition or other manufacturing process.

Figure 7:
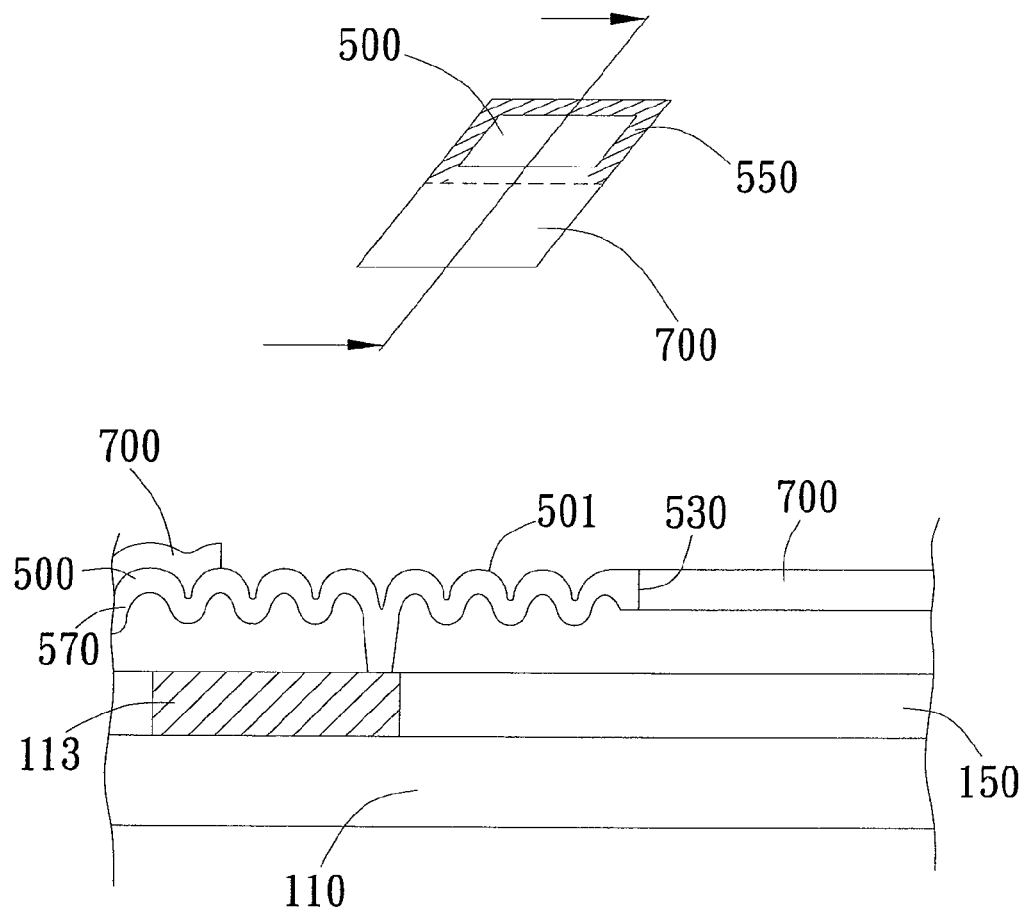
FIG. 7 is a sectional view of another preferred embodiment of the liquid crystal driving electrode of the present invention.

As the FIG. 3 and FIG. 5 show, the light-transmissible electrode 700 overlaps the transmission area 133 on the substrate 110. The light-transmissible electrode 700 electrically connects to the transmission area boundary 530 and having signal continuity with the active switch component 113. As the embodiment shown in FIG. 3, the light-transmissible electrode 700 extends to overlap the transmission area boundary 530 of the reflecting electrode layer 500. Therefore, the contact area of the light-transmissible electrode 700 on the reflecting electrode layer 500 becomes larger so as to decrease the resistance while conducting electricity. However, in another embodiment, the light-transmissible electrode 700 may merely touch the transmission area boundary 530, as shown in FIG. 7, which may also achieve the goal of electrical connection and signal transmission effect.

As the FIG. 5 shows, the light-transmissible electrode 700 extends to overlap the effective margin 550. In the preferred embodiment, the light-transmissible electrode 700 completely overlaps the effective margin 550 and forms a closed circular structure. The closed circular structure exposes the optical reflecting pattern of the reflecting electrode layer 500 outside the light-transmissible electrode 700, thus having better reflecting effect. However, in another embodiment, the light-transmissible electrode 700 may partially overlap the effective margin 550 or form a discontinuous extending structure.

Since the reflecting electrode layer 500 partially overlapped by the light-transmissible electrode 700 may avoid being exposed in the latter manufacturing process and further decreasing the chance of damage, the structure of that part of the reflecting electrode layer 500 and its adhesive with the substrate 110 are both better. In other words, the displacement of that part of the reflecting electrode layer 500 encounters stronger restrictions in the direction vertical to the substrate 110, further limiting the displacement of the outside boundary 510 in the direction vertical to the substrate 110 simultaneously is more limited due to its mechanical structure. Therefore, under the condition of complicated manufacturing process, even the reflecting electrode layer 500 is soaked in the developing agent or implementing other process, the tilts and cracks may not occur in the outside boundary 510 of the reflecting electrode layer 500 because of the light-transmissible electrode 700 covering on it.

In addition, because the light-transmissible electrode 700 extends to partially or completely overlap the reflecting electrode layer 500 of the effective margin 550, thus the light-transmissible electrode 700 also has the function of directly restricting the displacement of the reflecting electrode layer 500 around the effective margin 550 in the direction vertical to the substrate 110. As a result of mechanical structure's limitation, the light-transmissible electrode 700 further indirectly or directly limits the displacement of the outside boundary 510 of the reflecting electrode layer 500 in the direction vertical to the substrate 110. Therefore, even though the manufacturing process is complicated, the tilts and cracks may not occur on the outside boundary 510 of the reflecting electrode layer 500 because of being overlapped by the light-transmissible electrode 700 on it.

The preferred embodiment of the light-transmissible electrode 700 is made of indium tin oxide, ITO. However, in another embodiment, the light-transmissible electrode 700 may be made of indium zinc oxide, IZO or other transparent material conductive material. In the preferred embodiment, the thickness of the light-transmissible electrode 700 is between 200 Å and 1000 Å.

Figure 8A:
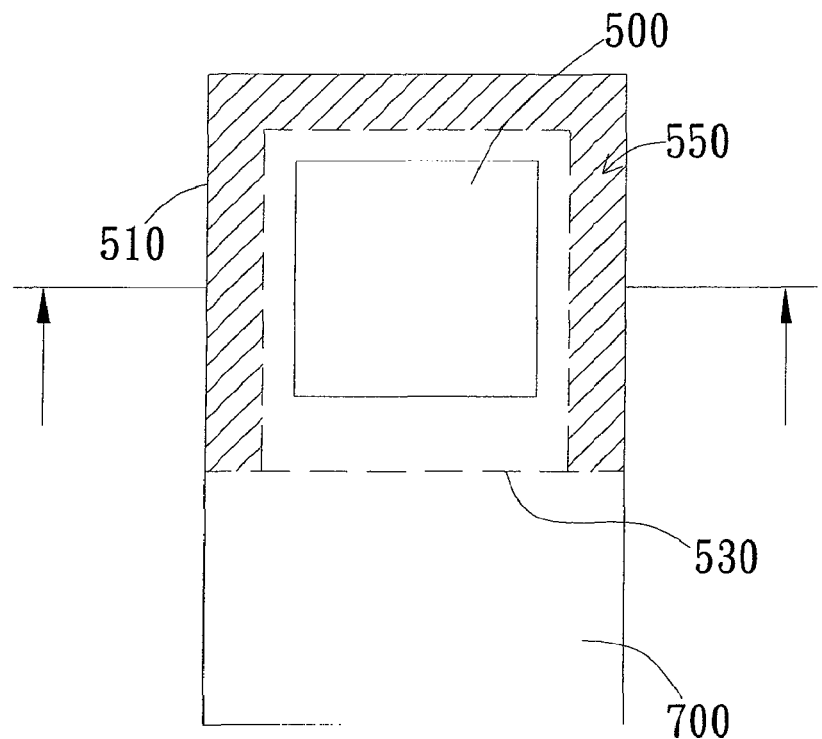
FIG. 8a is a top view of another preferred embodiment of the liquid crystal driving electrode of the present invention.
Figure 8B:
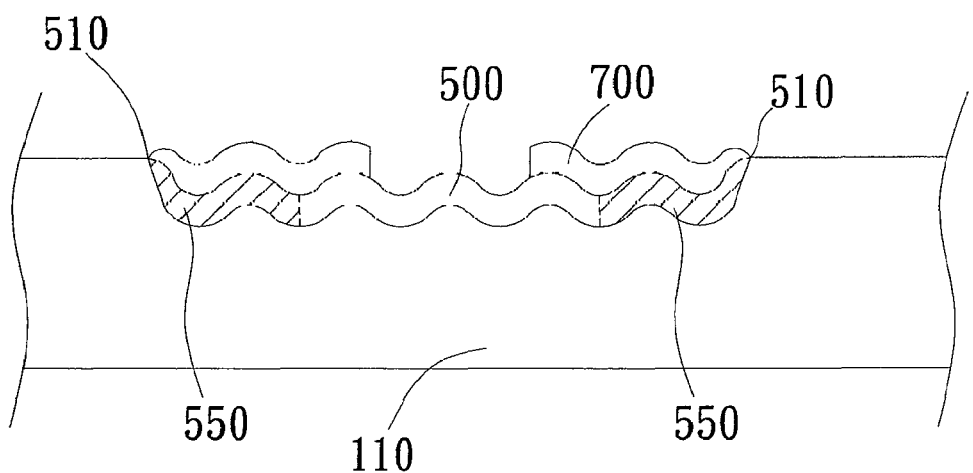

FIG. 8a and FIG. 8b show another embodiment of the present invention. In the embodiment, the light-transmissible electrode 700 overlaps the outside boundary 510 of the reflecting electrode layer 500 completely. In addition to overlapping the effective margin 550, the light-transmissible electrode 700 partially overlaps the reflecting electrode layer 500 within the effective margin 550 at the same time. The scope and shape of the overlapped part may vary from different demands. However, in another embodiment, the light-transmissible electrode 700 may either completely overlap or completely expose the reflecting electrode layer 500 within the effective margin 550 as well.

Figure 9A:
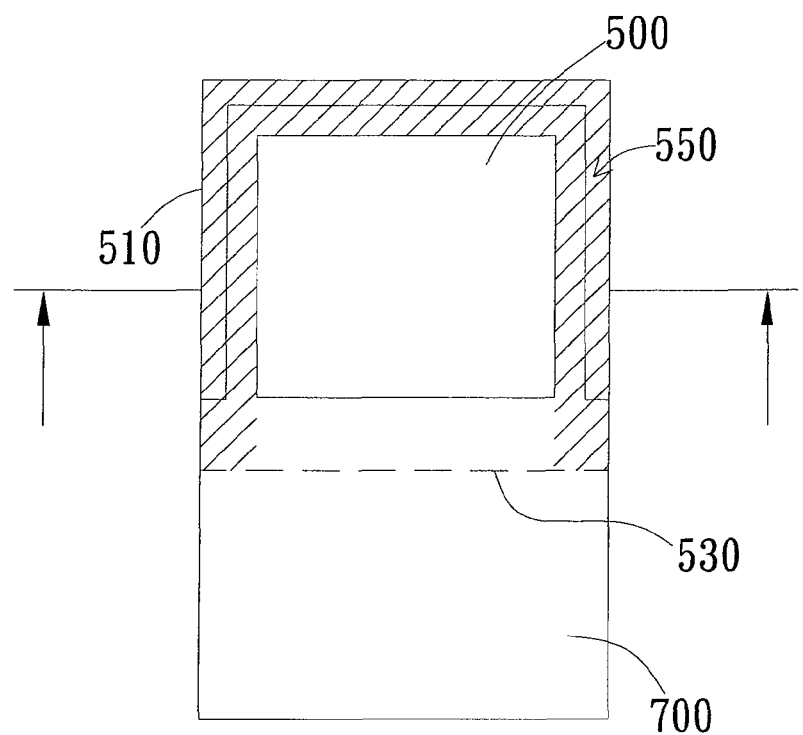
FIG. 9a is a top view of another preferred embodiment of the liquid crystal driving electrode of the present invention.
Figure 9B:
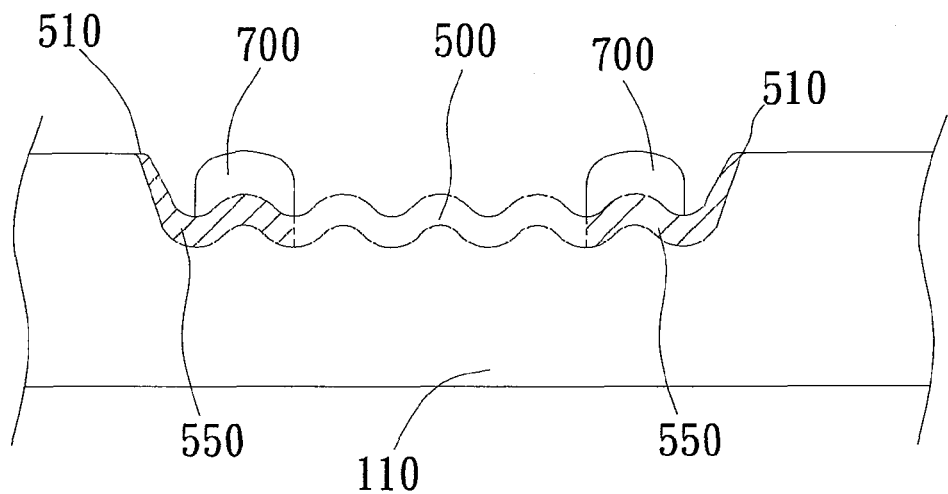

FIG. 9a and FIG. 9b show another embodiment of the present invention. In the embodiment, the edge of the light-transmissible electrode 700 is inside the outside boundary 510 of the reflecting electrode layer 500. That is, the area of the effective margin 550 close to the outside boundary 510 is exposed outside the light-transmissible electrode 700. In the embodiment, the distance between the edge of the light-transmissible electrode 700 and the outside boundary 510 of the reflecting electrode layer 500 is preferably less than 3 micrometers.

Figure 10A:
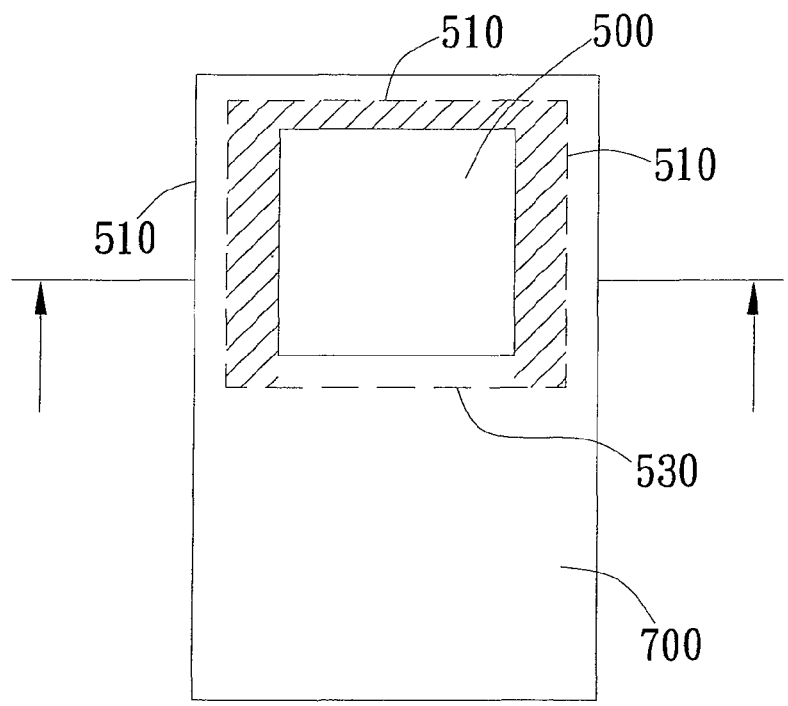
FIG. 10a is a top view of another preferred embodiment of the liquid crystal driving electrode of the present invention.
Figure 10B:
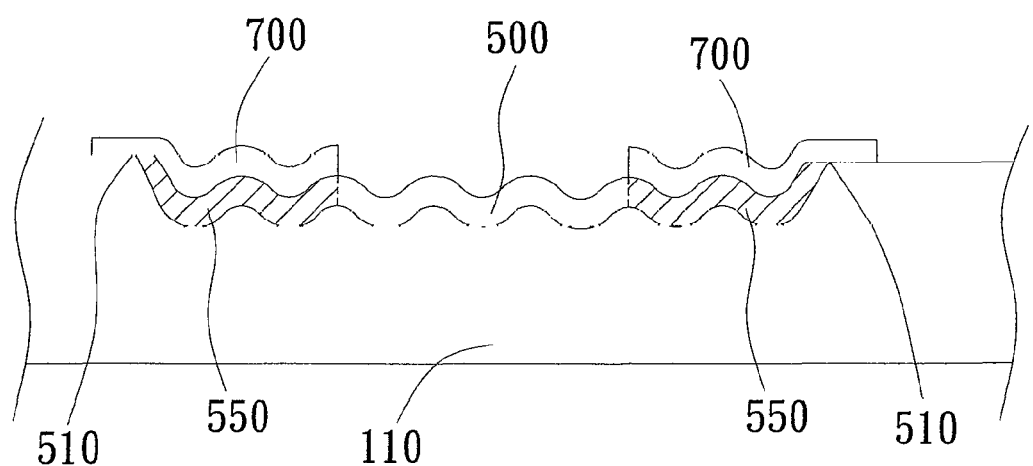

FIG. 10a and FIG. 10b show another embodiment of the present invention. In the embodiment, the light-transmissible electrode 700 extends over the outside boundary 510 of the reflecting electrode layer 500. In the embodiment, the extending part of the light-transmissible electrode 700 may provide more protection to reflecting electrode layer 500, thus reducing the chance of tilts and cracks occurred in the outside boundary 510.

Figure 11A:
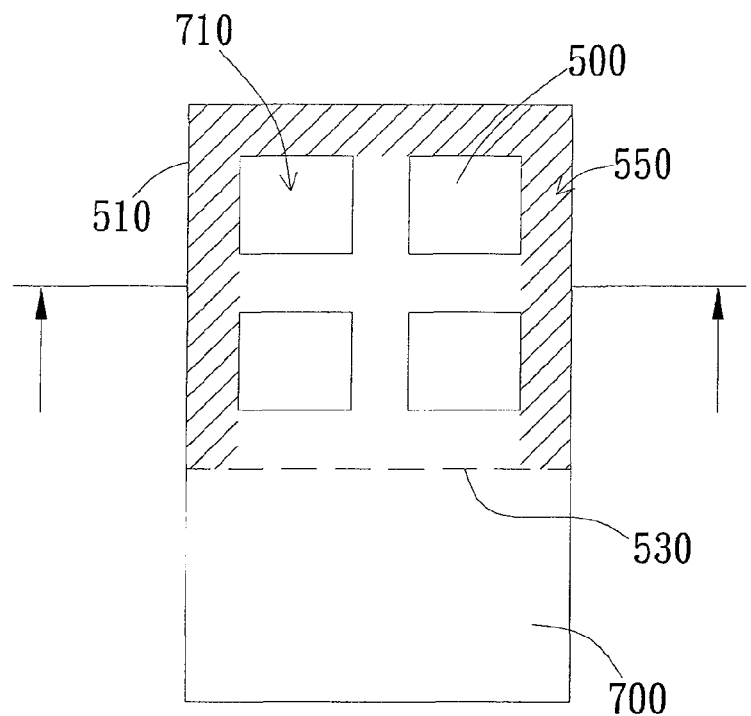
FIG. 11a is a top view of another preferred embodiment of the liquid crystal driving electrode of the present invention.
Figure 11B:
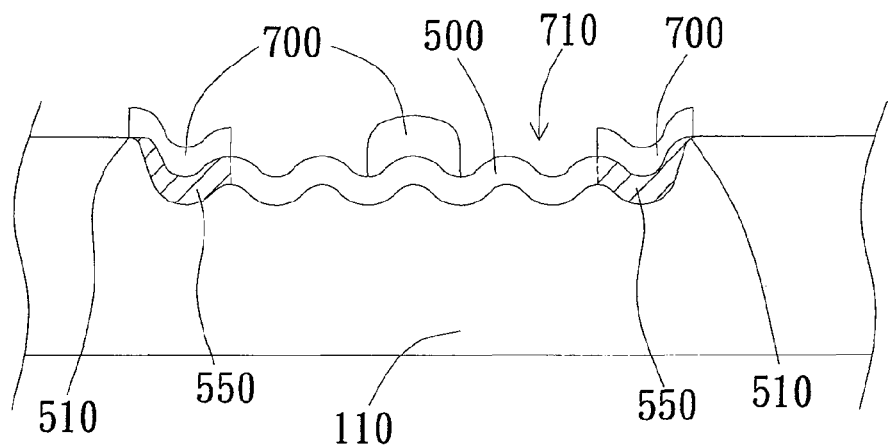

In the manufacturing process of forming the reflecting electrode layer 500 and the light-transmissible electrode 700, the reflecting electrode layer 500 is firstly formed. Then the light-transmissible electrode 700 is formed to completely overlap the reflecting electrode layer 500. A part or full of the light-transmissible electrode 700 outside the effective margin 550 in the reflecting area 131 will be removed afterwards. In the condition of partially removing the light-transmissible electrode 700 outside the effective margin 550, the light-transmissible electrode 700 on the reflecting electrode layer 500 may includes a plurality of apertures structures 710 to expose certain part of the reflecting electrode layer 500. The shape of the aperture structure 710 may be circular, elliptical or irregular. As the embodiment shown in FIG. 11a and FIG. 11b, the aperture structure 710 on the light-transmissible electrode 700 is shaped in rectangular. The reflecting electrode layer 500 is exposed through the rectangular aperture structure 710.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A liquid crystal driving electrode, comprising: a substrate having a reflection area and a transmission area; a reflecting electrode layer overlapping said reflection area, wherein said reflecting electrode layer has an outside boundary, a transmission area boundary and an effective margin, said outside boundary and said transmission area boundary jointly forming a closed boundary of said reflecting electrode layer, said effective margin being on the surface of said reflecting electrode layer and adjacent to said outside boundary, wherein the entire outside boundary is around the effective margin of the reflecting electrode layer; and a light-transmissible electrode overlapping said transmission area and electrically connecting to the reflecting electrode layer; wherein said light-transmissible electrode extends to cover said effective margin to substantially expose a portion of the reflecting electrode layer.

2. The liquid crystal driving electrode of claim 1, wherein said light-transmissible electrode completely overlaps said effective margin.

3. The liquid crystal driving electrode of claim 1, wherein said light-transmissible electrode extends to overlap said transmission area boundary of said reflecting electrode layer.

4. The liquid crystal driving electrode of claim 1, wherein the thickness of said reflecting electrode layer is more than about 200 Å.

5. The liquid crystal driving electrode of claim 1, wherein the thickness of said light-transmissible electrode is between about 200 Å and about 1000 Å.

6. The liquid crystal driving electrode of claim 1, wherein said reflecting electrode layer includes an Al electrode layer, an Al—Nd alloy layer, an Ag electrode layer, a Mo electrode layer or combinations thereof.

7. The liquid crystal driving electrode of claim 6, wherein the thickness of said reflecting electrode layer is more than about 50 Å.

8. The liquid crystal driving electrode of claim 1, wherein said light-transmissible electrode includes an indium tin oxide (ITO) layer, an indium zinc oxide (IZO) layer or combinations thereof.

9. The liquid crystal driving electrode of claim 1, wherein said substrate includes an active switch component disposed in said reflection area and at least partially overlapped with said reflecting electrode layer.

10. The liquid crystal driving electrode of claim 9, wherein said active switch component includes a thin film transistor (TFT).

11. The liquid crystal driving electrode of claim 1, wherein the width of said effective margin is between about 1 and about 10 μm.

12. The liquid crystal driving electrode as claim 1, wherein said effective margin extends to form a U shaped girdle area along with said outside boundary.

13. The liquid crystal driving electrode as claim 1, wherein the light-transmissible electrode substantially shields the effective margin which is a U shaped girdle area along with the outside boundary.

14. A liquid crystal display, comprising: a liquid crystal driving electrode, comprising: a substrate having a reflection area and a transmission area; a reflecting electrode layer overlapping said reflection area, wherein said reflecting electrode layer has an outside boundary, a transmission area boundary and an effective margin, said outside boundary and said transmission area boundary jointly forming a closed boundary of said reflecting electrode layer, said effective margin being on the surface of said reflecting electrode layer and adjacent to said outside boundary, wherein the entire outside boundary is around the effective margin of the reflecting electrode layer; and a light-transmissible electrode overlapping said transmission area and electrically connecting to the reflecting electrode layer; wherein said light-transmissible electrode extends to cover said effective margin to substantially expose a portion of the reflecting electrode layer; a biased electrode disposed over said liquid crystal driving electrode; and a liquid crystal layer disposed between said liquid crystal driving electrode and said biased electrode.

15. The liquid crystal display of claim 14, wherein said light-transmissible electrode completely overlaps said effective margin.

16. The liquid crystal display of claim 14, wherein said light-transmissible electrode extends to overlap said transmission area boundary of said reflecting electrode layer.

17. The liquid crystal display of claim 14, wherein the thickness of said reflecting electrode layer is more than about 200 Å.

18. The liquid crystal display of claim 14, wherein the thickness of said light-transmissible electrode is between about 200 Å and about 1000 Å.

19. The liquid crystal display of claim 14, wherein said reflecting electrode layer includes an Al electrode layer, an Al—Nd alloy layer, an Ag electrode layer, a Mo electrode layer or combinations thereof.

20. The liquid crystal display of claim 14, wherein the thickness of said reflecting electrode layer is more than about 50 Å.

21. The liquid crystal display of claim 14, wherein said light-transmissible electrode includes an indium tin oxide (ITO) layer, an indium zinc oxide (IZO) layer or combinations thereof.

22. The liquid crystal display of claim 14, wherein said substrate includes an active switch component disposed in said reflection area and at least partially overlapped with said reflecting electrode layer.

23. The liquid crystal display of claim 22, wherein said active switch component includes a thin film transistor (TFT).

24. The liquid crystal display as claim 14, wherein said effective margin extends to form a U shaped girdle area along with said outside boundary.

25. The liquid crystal display as claim 14, wherein the light-transmissible electrode substantially shields the effective margin which is a U shaped girdle area along with the outside boundary.

* * * * *